Patented Aug. 22, 1944

2,356,290

UNITED STATES PATENT OFFICE 2,356,290

COMPOSITION AND PROCESS

Adolph F. Wendler, Wilmington, Del., assignor to E. I. du Pont de Nemours & Company, Wilmington, Del., a corporation of Delaware No Drawing. Application June 15, 1940, Serial No. 340,782

12 Claims. (Cl. 154—40)

This invention relates to sheet wrapping material, especially transparent moistureproofed cellulosic web. More particularly it appertains to the solvent sealing of layers of regenerated cellulose and like film having moistureproofing coatings.

Recently there has appeared in commerce a transparent moistureproof sheet wrapping material comprising a base sheet of regenerated cellulose film having a thin moistureproofing coating. The moistureproofing coating ordinarily employed comprises essentially a film forming agent (binder, cementing agent), for example, nitrocellulose, and a moistureproofing agent, for example, a waxy material such as paraffin wax. The coating may also contain, in addition, a blending agent for the various ingredients. Frequently a plasticizer, for the coating, is also present.

The manufacture of such a base sheet is described in U. S. A. Patent No. 1,548,864, (Brandenberger), and the coating thereof with typical moistureproofing coating compositions is described in U. S. A. Patent No. 1,737,187 (Charch and Prindle).

Because these moistureproof sheet wrapping materials, in addition to effectively resisting penetration or passage of water vapor therethrough to a substantial degree for an extended period of time, are also flexible, transparent, non-tacky and non-greasy, they have gone into very extensive use. In wrapping articles which are apt to deteriorate by loss or gain of moisture, it is desirable that the wrapping completely envelope the article and be sealed in order to maintain them in their original fresh or otherwise desirable state.

The commonly available adhesives have not been found satisfactory for sealing such materials because of the chemical and physical characteristics of the surface coating, particularly its water insolubility and thinness. The water soluble adhesive compositions do not stick to the surface coating, and do not cause superimposed layers of the sheet wrapping material to adhere to each other. Various other schemes for sealing such a material have been proposed, but in general the results are quite unsatisfactory by reason of impairment of the coating, destruction of the moistureproofing characteristics of the container, the rendering tacky of the coating upon the surface of the sheet opposite the seal, etc.

It was an object of this invention to provide an adhesive material which could be used to join or secure materials having surfaces containing a waxy substance. Other objects were to provide for the sealing of sheet wrapping material having an organic solvent soluble substance on its surface, to provide for the sealing of flexible sheet material, having organic solvent soluble cellulose derivative or resin material, to similar materials or surfaces containing organic solvent soluble substances such as cellulose derivatives, and to provide for the solvent sealing of moistureproofed regenerated cellulose sheet. A more specific object was to seal layers of regenerated cellulose having moistureproof coatings comprising essentially a wax moistureproofing material and a binder, and, optionally, a blending gum or resin and/or plasticizer with a water soluble amide of low volatility. A general advance in the art, and other objects which will appear hereinafter, are also contemplated.

It has now been found that water soluble amides, particularly those of the formula:

in which R represents a radical from the group consisting of hydrogen, and aliphatic type radicals such as aliphatic hydrocarbon radicals, halogenated aliphatic radicals, cycloaliphatic radicals, hetero-aliphatic radicals and aryl substituted aliphatic radicals (aralkyl radicals), Y represents a radical from the group consisting of hydrogen, and aliphatic type radicals such as aliphatic hydrocarbon radicals, halogenated aliphatic radicals, cycloaliphatic radicals, hetero-aliphatic radicals and aryl substituted aliphatic radicals (aralkyl radicals), and Z represents an aliphatic radical such as aliphatic hydrocarbon radicals, halogenated aliphatic radicals, cycloaliphatic radicals, hetero-aliphatic radicals and aryl substituted aliphatic radicals (aralkyl radicals), and in which Y and Z may represent terminal carbon atoms of a radical from the group consisting of aliphatic type radicals such as halogenated aliphatic radicals and hetero-aliphatic radicals (aliphatic radicals containing heteroatoms), cause moistureproof sheet wrapping material layers to be sealed to each other. In its simplest form the invention contemplates moistening the surfaces to be sealed with the amide material, and subsequently pressing them together.

From the following description and specific examples, in which are disclosed certain embodiments of the invention as well as details of what is believed to be the best mode for carrying out the invention, it will be apparent how the foregoing objects and related ends are accomplished. Parts are given by weight throughout the specification unless otherwise specified.

Example I

A clear, transparent sheet of regenerated cellulose was coated with a moistureproofing composition consisting of:

| | Per cent |
|---|---|
| Nitrocellulose | 50 |
| Gum damar | 34 |
| Tricresyl phosphate | 12 |
| Paraffin (M. P. 60° C.) | 4 |

The coating was applied from solution in a solvent consisting of:

| | Per cent by volume |
|---|---|
| Ethyl acetate | 62 |
| Toluene | 27 |
| Alcohol | 9 |
| Butyl acetate | 2 |

The solution contained approximately 12% of the solids. The solvent was evaporated after the solution had been applied to the surface of the sheet, producing a clear, transparent coating.

When the surface of this coated sheet was moistened with dimethyl formamide and pressed at 130° C. upon a similar surface, it was found to readily adhere. It was then allowed to stand for a period of 180 minutes exposed to the atmosphere, and upon testing it was found that an exceptionally strong adhesive bond between the two sheets had been formed.

The strength of this bond was 152 grams in terms of the test given elsewhere in this application.

Example II

Another sample of the film of Example I was moistened with dimethyl acetamide, and the two surfaces pressed together at 130° C. A bond strength of 214 grams resulted.

Example III

Another sample of the transparent moistureproof wrapping tissue of Example I was moistened with dibutyl formamide, and the surfaces so moistened were pressed together at 130° C. A bond of 180 grams strength was found to have occurred.

In some instances it has been found that the amides used as sealing agents exert a rather strong solvent action upon the particular coating to which it is applied. This solvent action may be reduced, and the general effectiveness of the sealing material increased, without detracting from the strength of the adhesive bond by adding to the amide modifying agents which serve to reduce somewhat the solvent action on the coating. Such mixtures or solutions do not impair the properties of the sealing agent which provide for easy application and formation of the seal. Examples of such modified sealing compositions follow.

Example IV

Two pieces of moistureproof regenerated cellulose sheet of the type employed in Example I were joined together by moistening the surfaces with the dimethyl formamide-water compositions listed below, and subsequently pressing the moistened surfaces together at a temperature of 130° C.

| Sealing solution | Seal strength |
|---|---|
| | Grams |
| (a) DMF 95%—$H_2O$ 5% | 186 |
| (b) DMF 90%—$H_2O$ 10% | 158 |
| (c) DMF 85%—$H_2O$ 15% | 148 |
| (d) DMF 80%—$H_2O$ 20% | 154 |
| (e) DMF 75%—$H_2O$ 25% | 130 |
| (f) DMF 70%—$H_2O$ 30% | 151 |
| (g) DMF 60%—$H_2O$ 40% | 155 |
| (h) DMF 50%—$H_2O$ 50% | 115 |

DMF designates dimethyl formamide.

Example V

Transparent, moistureproof regenerated cellulose sheet wrapping material of the type described in Example I was sealed by moistening with dimethyl acetamide-water mixtures of varying strength, followed by pressing the moistened surfaces together at 130° C. Exceptionally good bond strengths were obtained, as indicated in the following tabulation:

| Sealing solution | Seal strength |
|---|---|
| | Grams |
| (a) DMA 100% | 214 |
| (b) DMA 95%—$H_2O$ 5% | 226 |
| (c) DMA 90%—$H_2O$ 10% | 237 |

DMA designates dimethyl acetamide.

The seals made with dimethyl acetamide and its solutions were of good appearance and entirely free from odor.

Example VI

Transparent moistureproof regenerated cellulose film of the type described in Example I, were sealed by moistening with dimethyl formamide-ethanol solutions and pressing the moistened portions together at a temperature of 130° C. Good bond strengths were obtained as indicated by the following tabulation:

| Sealing solution | Seal strength |
|---|---|
| | Grams |
| (a) DMF 90%—ethanol 10% | 141 |
| (b) DMF 80%—ethanol 20% | 145 |
| (c) DMF 70%—ethanol 30% | 139 |
| (d) DMF 60%—ethanol 40% | 154 |
| (e) DMF 50%—ethanol 50% | 141 |

It has also been found that the admixture of materials which are plasticizers for the moistureproofing coating upon the regenerated cellulose sheet with the amide sealing compositions, lead to very good seal strength. Examples of such modified sealing compositions follow.

Example VII

Transparent moistureproof regenerated cellulose sheet wrapping material of the type described in Example I, was sealed to itself with various amide plasticizer solutions, with the following results:

| Sealing solution | Seal strength |
|---|---|
| | Grams |
| (a) DMA 95%—dibutyl phthalate 5% | 270 |
| (b) DMA 90%—dibutyl phthalate 10% | 208 |
| (c) DMF 95%—dibutyl phthalate 5% | 251 |
| (d) DMF 90%—dibutyl phthalate 10% | 198 |

Example VIII

Satisfactory sealing results with transparent moistureproof regenerated cellulose sheet wrapping material and 3 component sealing solutions or mixtures, were obtained as indicated by the tabulation following. The moistureproofing coating was of the type described in Example I.

| Sealing solution | Sealing strength |
|---|---|
| | Grams |
| (a) DMF 80%—H₂O 10%—Ethanol 10% | 144 |
| (b) DMF 70%—H₂O 20%—Tricresyl phosphate 10% | 212 |
| (c) DMF 75%—H₂O 15%—Dibutyl phthalate 10% | 192 |

The sealing solutions of this invention can, in addition to sealing regenerated cellulose and like sheet material having moistureproofing coatings, also be employed to seal uncoated films. Examples of such films in which seals of great bond strength are effected, are cellulose derivatives, rubber derivatives, vinyl resins, and the like. The results obtained with such cellulose substitution derivatives as cellulose esters, for example, organic solvent soluble cellulose acetate, and cellulose ethers, for example organic solvent soluble ethyl cellulose, are excellent. The seals obtained with the halogen containing rubber derivatives such as rubber hydrochloride (26% to 34% Cl), and the polymeric vinyl acetals, for example, polyvinyl butyral, are extremely strong. The results with such materials follow.

Example IX

Ethyl cellulose of 48% ethoxyl content was employed for test purposes.

| Sealing solution | Seal strength |
|---|---|
| | Grams |
| (a) DMF 50%—isopropanol 50% | 282 |
| (b) DMF 50%—ethanol 50% | 357 |
| (c) DMF 80%—H₂O 20% | 355 |

Example X

Cellulose acetate of 56% combined acetic acid content was used for testing purposes.

| Sealing solution | Seal strength |
|---|---|
| | Grams |
| (a) DMF 50%—isopropanol 50% | 375 |
| (b) DMF 50%—ethanol 50% | 436 |

Example XI

Rubber hydrochloride film of 30% chlorine content was utilized for testing purposes.

| Sealing solution | Seal strength |
|---|---|
| | Grams |
| (a) DMF 80%—H₂O 20% | 1,170 |

Example XII

Polyvinyl butyral[1] film (hydroxyl 19%, butyral 80%, acetyl 1%), was used in this test.

| Sealing solution | Seal strength |
|---|---|
| | Grams |
| (a) DMF 100% | 1,000 |

[1] That is, hydroxyl corresponding to 19% polyvinyl alcohol, butyral corresponding to 80% polyvinyl butyral, and acetal corresponding to 1% polyvinyl acetate.

The preferred sealing material is dimethyl formamide, but the results obtained with dimethyl acetamide are so outstanding that it is frequently difficult to choose between the two. The amides which present data indicate as most satisfactory are dimethyl formamide, diethyl formamide, dipropyl formamide, dibutyl formamide, dimethyl acetamide, diethyl acetamide, dipropyl acetamide, dimethyl propionamide, diethyl propionamide, dimethyl butyramide, allyl formamide, dimethyl methacrylamide, dimethyl methoxyacetamide, N-formyl hexamethylene imine, N-formyl morpholine, mono-beta-chloro-ethyl formamide, di-beta-chloro-ethyl formamide, di(beta-methoxy-ethyl) formamide, di(beta-methoxy-ethyl) acetamide, benzyl formamide, and dimethyl-phenyl acetamide.

Mixtures of the amides may be used when desired, and the amides may be mixed with modifying substances as indicated in the specific examples. The preferred modifying materials are water, low boiling organic solvents such as esters, alcohols, ketones, mono-methyl ether of ethylene glycol, etc., high boiling organic solvents of the plasticizer class, and the adhesive materials already known as suitable for use upon moistureproofed transparent non-fibrous cellulosic sheeting like regenerated cellulose and cellulose acetate.

The 130° C. sealing temperature of Examples I–VIII and 116° C. sealing temperature of Examples IX–XII are arbitrary figures chosen for test purposes to enable comparisons to be readily and promptly made.

The time period of 180 minutes utilized in the examples was chosen for the same reasons. Actually the amides form satisfactory seals almost instantaneously when run through automatic sealing machines. These seals may not reach their full strength until a certain amount of time has elapsed, and it was for this reason that what might be considered an outside limit (180 minutes) was chosen.

The invention is not limited to the sealing of sheets having the moistureproof coating set out in Example I. Other moistureproofing coatings are disclosed in the patents above listed, and the solvent sealer compositions therein are applicable thereto. Similarly, the invention is not limited to the uncoated sheet materials above listed although the results with the organic solvent soluble sheets (films, foils) of cellulose esters and ethers, and rubber compositions such as rubber hydrochloride and chlorinated rubber (67% Cl), and resinous materials like vinyl resins, are quite outstanding. The amides of this invention can also be used satisfactorily for sealing moistureproofed sheet materials comprising base sheets of these last mentioned materials as well as various bases such as regenerated cellulose coated with compositions comprising these same materials.

If desired, wetting agents may be added to the solvent compositions, particularly those containing high percentages of water.

Preferably the amides are soluble in water to the extent of 5% at 20° C., and dissolve water to the extent of 25% at 20° C. In this connection, compositions consisting of 90% dimethyl formamide plus 10% glycol amide, and 90% dimethyl formamide plus 10% mono-cyclohexyl formamide sealed at 130° C. in the manner described elsewhere in the application, give seal strengths of 190 and 193, respectively. Amides in which radicals containing not more than 4 carbon atoms are represented by R, Y and Z in the general formula given above are preferred when these substituent groups are alkyl residues (groups, nuclei). The saturated aliphatic hydrocarbon radicals are preferred to the unsaturated radicals in the same relation. In general the lower members of the homologous paraffin series are preferred to polymethylene chains, although very good results have been obtained where the amides contain heterocyclic rings including polymethylene residues.

As indicated above, seals may be formed between the plies of material by the application of heat and pressure to the sheet material which has been moistened with a single amide or one or more amides to which various materials have been added, but in many cases it is merely necessary to apply pressure without heat. The heat serves to volatilize the solvent more readily, and hence a shorter time is required to reach the ultimate bond strength.

The strength of the seal formed in the examples was determined by the following procedure. A narrow strip of adhesive solvent was applied by means of a camel's hair brush to one of two strips of material (to be sealed) 1½ inches wide. When the material to be sealed had a moistureproof coating, the solvent was applied to a side bearing the coating. The two strips were then superimposed one upon the other in such a manner that the unmoistened strip came into contact with the moistened surface. The seal was then made across the width of the strips at one end by placing the contacting films on a metal plate heated to the predetermined temperature, and rolling thereover a roller ⅝ of an inch wide weighted to 650 grams. The two strips so sealed were opened at the free end and placed in a stretching device such as a Suter testing machine, by slipping each end of the sheet into suitable flanges, one of which was fixed while the other was moved away at a constant speed of 12 inches per minute. The force in grams required to pull the sheets apart was taken as a measure of the seal bond strength.

Moistureproofness, moistureproofing, and moistureproof materials and expressions, are defined in U. S. A. Patent No. 2,147,180 (Ubben). In the interest of brevity the definitions are not repeated here. The terms and expressions related thereto and employed therein are used in accordance with such definitions.

The use of the sealing compositions of this invention is particularly advantageous upon automatic wrapping machinery such as that employed in wrapping cigarette packages with the moistureproofed regenerated cellulose sheet of U. S. A. Patent 1,737,187. In such cases it is common practice to apply the adhesive sealer by means of a wick which is fed from a reservoir, and then to make the necessary fold by means of machinery, and thereafter to make the final seal by the application of a weighted bar heated to approximately 116° C. When applicant's amides are utilized for cementing the surfaces, a firm and permanent bond which does not result in a wrinkled joint, is formed. This joint does not loosen or separate with temperature variations. It withstands immersion in water, is flexible, smooth, odorless, and the seal is invisible. The fact that there is no tendency for the joint to come apart when exposed to heat or cold is very important.

With some of the amides of the present invention it has been found that the addition of water actually increases the seal strength. This is especially noticeable in the case of dimethyl formamide. This is an important advantage of applicant's sealing materials over those heretofore known. This is of the utmost importance where the seals are apt to be contaminated with water or where the sealed products are to be stored or handled in high relative humidities. An additional advantage found with dimethyl formamide and other members of the group of sealers of this invention is their exceptional high hygroscopicity. This effectively prevents the drying out of seal joints to an extent where they would lose their tenacity.

The compatibility of the amides of this invention with water, the monomethyl ether of ethylene glycol, ethanol and various nitrocellulose lacquer plasticizers, as well as many other materials which might by chance be encountered in the sealing of moistureproofed transparent nonfibrous materials, such as regenerated cellulose, is an additional advantage.

The volatility of the amide compounds included in this invention is in general lower than the volatility of the best solvent sealers heretofore known. This property gives applicant's compounds a considerable advantage in a number of uses, since it appears that materials having lower volatility give seals of increased strength.

The sealing solutions of this invention are particularly suited to the formation of strong seals between sheets of cellulose derivatives and other film forming materials, and between sheets coated with compositions containing cellulose derivatives, particularly cellulose substitution derivatives such as cellulose ethers and esters and materials of a resinous or rubber-like nature. The appearance of the solvent seal formed with these materials is in general superior to that formed with known materials. The usual puckering is not encountered, and the transparency is greater.

The sealing compositions of this invention, when applied to one side of a moistureproof regenerated cellulose film, will not penetrate the film and result in softening of the coating on the opposite side. This is of great importance where the sealed packages are to be in contact with one another or with surrounding objects shortly after the formation of the seal. It also makes possible the sealing of wrappers about objects to which it is desired that the wrappers not adhere in any way, or mar the surface of the wrapped article.

Tests have shown that regenerated cellulose film printed with aniline printing dyes, gravure dyes, and letter press printing, may all be sealed within the composition of this invention with no marring of the printing. This is important not only where the regenerated cellulose to be sealed contains printing, but also where the sealed joints may be in contact with printed matter upon the surface of the article wrapped. The negligible, or very slight, odor which may in some instances result from the utilization of the amides of this invention is not disagreeable. After the formation of the seal and the evaporation of the solvent, no odor whatsoever remains, so that the amide compositions of this invention are satisfactory for sealing food products, tobacco products, cosmetics, and all other articles in which the absence of odor in the wrapping is of importance.

The present invention is important also in wrappings other than those effected by automatic machinery, because the seal may be made with a slight pressure such as might be exerted by the hand.

As many apparently widely different embodiments of this invention may be made without departing from the spirit and scope thereof, it is to be understood that this invention is not limited to the specific embodiments thereof except as defined in the appended claims.

I claim:

1. A method of securing adhesion between sheets, the surfaces of which are of substantially identical compositions and are composed of an organic solvent soluble material which comprises applying to at least one of said surfaces an amide of the formula:

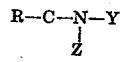

in which R and Y represent a radical from the group consisting of hydrogen and aliphatic type radicals, Z represents an aliphatic radical, and Y and Z may represent terminal carbon atoms of a single aliphatic type radical, said amide being soluble in water to the extent of 5% at 20° C., and pressing the surfaces of said sheets together for immediate drying and bonding of the sheets.

2. A method of securing adhesion between sheets, the surfaces of which are of substantially identical compositions and are composed of an organic solvent soluble cellulose substitution derivative material which comprises applying to at least one of said surfaces an amide of the formula:

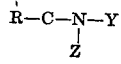

in which R and Y represent a radical from the group consisting of hydrogen and aliphatic type radicals, Z represents an aliphatic radical, and Y and Z may represent terminal carbon atoms of a single aliphatic type radical, said amide being soluble in water to the extent of 5% at 20° C., and pressing the surfaces of said sheets together for immediate drying and bonding of the sheets.

3. A method of securing adhesion between sheets, the surfaces of which are of substantially identical compositions and are composed of an organic solvent soluble material which comprises applying to at least one of said surfaces an amide taken from the group consisting of dimethyl formamide, diethyl formamide, dipropyl formamide, dibutyl formamide, dimethyl acetamide, diethyl acetamide, dipropyl acetamide, dimethyl propionamide, diethyl propionamide, dipropyl propionamide, dimethyl butyramide, allyl formamide, dimethyl methacrylamide, dimethyl methoxyacetamide, N-formyl hexamethylene imine, N-formyl morpholine, di-beta-chloro-ethyl formamide, di(beta-methoxy-ethyl) formamide, di(beta-methoxy-ethyl) acetamide, benzyl formamide, and dimethylphenyl acetamide, and pressing the surfaces of said sheets together for immediate drying and bonding of the sheets.

4. A method of securing adhesion between sheets, the surfaces of which are of substantially identical compositions and are composed of an organic solvent soluble cellulose substitution derivative material, which comprises applying to at least one of said surfaces an amide taken from the group consisting of dimethyl formamide, diethyl formamide, dipropyl formamide, dibutyl formamide, dimethyl acetamide, diethyl acetamide, dipropyl acetamide, dimethyl propionamide, diethyl propionamide, dipropyl propionamide, dimethyl butyramide, allyl formamide, dimethyl methacrylamide, dimethyl methoxyacetamide, N-formyl hexamethylene imine, N-formyl morpholine, di-beta-chloro-ethyl formamide, di(beta-methoxy-ethyl) formamide, di(beta-methoxy-ethyl) acetamide, benzyl formamide, and dimethylphenyl acetamide, and pressing the surfaces of said sheets together for immediate drying and bonding of the sheets.

5. A method of securing adhesion between sheets, the surfaces of which are of substantially identical compositions and are composed of an organic solvent soluble material, which comprises applying to at least one of said surfaces dimethyl formamide, and pressing the surfaces of said sheets together for immediate drying and bonding of the sheets.

6. A method of securing adhesion between sheets, the surfaces of which are of substantially identical compositions and are composed of an organic solvent soluble cellulose substitution derivative material, which comprises applying to at least one of said surfaces dimethyl formamide, and pressing the surfaces of said sheets together for immediate drying and bonding of the sheets.

7. A method of securing adhesion between sheets, the surfaces of which are of substantially identical compositions and are composed of an organic solvent soluble material, which comprises applying to at least one of said surfaces a composition comprising water and an amide of the formula:

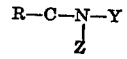

in which R and Y represent a radical from the group consisting of hydrogen and aliphatic type radicals, Z represents an aliphatic radical, and Y and Z may represent terminal carbon atoms of a single aliphatic type radical, said amide being soluble in water to the extent of 5% at 20° C., and pressing the surfaces of said sheets together for immediate drying and bonding of the sheets.

8. A method of securing adhesion between sheets, the surfaces of which are of substantially identical compositions and are composed of an organic solvent soluble cellulose substitution derivative material which comprises applying to at least one of said surfaces a composition comprising water and an amide of the formula:

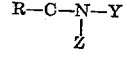

in which R and Y represent a radical from the group consisting of hydrogen and aliphatic type radicals, Z represents an aliphatic radical, and Y and Z may represent terminal carbon atoms of a single aliphatic type radical, said amide being soluble in water to the extent of 5% at 20° C., and pressing the surfaces of said sheets together for immediate drying and bonding of the sheets.

9. A method of securing adhesion between sheets, the surfaces of which are of substantially identical compositions and are composed of an organic solvent soluble material which comprises applying to at least one of said surfaces a composition comprising water and an amide taken from the group consisting of dimethyl formamide, diethyl formamide, dipropyl formamide, dibutyl formamide, dimethyl acetamide, diethyl acetamide, dipropyl acetamide, dimethyl propionamide, diethyl propionamide, dipropyl propionamide, dimethyl butyramide, allyl formamide, dimethyl methacrylamide, dimethyl methoxyacetamide, N-formyl hexamethylene imine, N-formyl morpholine, di-beta-chloro-ethyl formamide, di-(beta-methoxy-ethyl) formamide, di(beta-methoxy-ethyl) acetamide, benzyl formamide, and dimethylphenyl acetamide, and pressing the surfaces of said sheets together for immediate drying and bonding of the sheets.

10. A method of securing adhesion between sheets, the surfaces of which are of substantially identical compositions and are composed of an organic solvent soluble cellulose substitution derivative material which comprises applying to at least one of said surfaces a composition comprising water and an amide taken from the group consisting of dimethyl formamide, diethyl formamide, dipropyl formamide, dibutyl formamide, dimethyl acetamide, diethyl acetamide, dipropyl acetamide, dimethyl propionamide, diethyl propionamide, dipropyl propionamide, dimethyl butyramide, allyl formamide, dimethyl methacrylamide, dimethyl methoxyacetamide, N-formyl hexamethylene imine, N-formyl morpholine, di-beta-chloro-ethyl formamide, di(beta-methoxy-ethyl) formamide, di(beta-methoxy-ethyl) acetamide, benzyl formamide, and dimethylphenyl acetamide, and pressing the surfaces of said sheets together for immediate drying and bonding of the sheets.

11. A method of securing adhesion between sheets, the surfaces of which are of substantially identical compositions and are composed of an organic solvent soluble material which comprises applying to at least one of said surfaces a composition comprising water and dimethyl formamide, and pressing the surfaces of said sheets together for immediate drying and bonding of the sheets.

12. A method of securing adhesion between sheets, the surfaces of which are of substantially identical compositions and are composed of an organic solvent soluble cellulose substitution derivative material, which comprises applying to at least one of said surfaces a composition comprising water and dimethyl formamide, and pressing the surfaces of said sheets together for immediate drying and bonding of the sheets.

ADOLPH F. WENDLER.